(12) United States Patent
Hardy

(10) Patent No.: US 6,196,317 B1
(45) Date of Patent: Mar. 6, 2001

(54) METHOD AND COMPOSITIONS FOR REDUCING THE PERMEABILITIES OF SUBTERRANEAN ZONES

(75) Inventor: Mary Anne Hardy, Oude Ade (NL)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 09/212,370

(22) Filed: Dec. 15, 1998

(51) Int. Cl.⁷ .......................... E21B 43/22; E21B 33/138
(52) U.S. Cl. .......................... 166/295; 166/270; 166/300; 507/224; 507/226; 507/271; 507/272; 507/277; 507/903
(58) Field of Search ...................................... 166/270, 292, 166/294, 295, 300; 405/263, 264; 507/224, 225, 226, 271, 272, 277, 903; 523/130

(56) References Cited

U.S. PATENT DOCUMENTS

| | | | |
|---|---|---|---|
| 3,697,498 | * 10/1972 | Browning et al. | 507/903 X |
| 4,461,351 | 7/1984 | Falk | 166/295 |
| 4,655,942 | * 4/1987 | Dickert, Jr. et al. | 507/903 X |
| 4,664,713 | 5/1987 | Almond et al. | 106/209 |
| 4,773,481 | 9/1988 | Allison et al. | 166/270 |
| 4,799,550 | 1/1989 | Harris et al. | 166/300 |
| 5,133,408 | 7/1992 | Tackett | 166/270 |
| 5,146,986 | 9/1992 | Dalrymple | 166/294 |
| 5,161,615 | * 11/1992 | Hutchins et al. | 166/295 |
| 5,181,568 | 1/1993 | McKown et al. | 166/293 |
| 5,246,073 | * 9/1993 | Sandiford et al. | 166/295 |
| 5,304,620 | 4/1994 | Holtmyer et al. | 527/310 |
| 5,305,832 | * 4/1994 | Gupta et al. | 166/300 |
| 5,335,726 | 8/1994 | Rodrigues | 166/295 |
| 5,421,411 | * 6/1995 | Sydansk | 166/295 |
| 5,486,312 | * 1/1996 | Sandiford et al. | 507/225 X |
| 5,614,475 | * 3/1997 | Moorhouse et al. | 507/271 X |

FOREIGN PATENT DOCUMENTS 0005835 5/1979 (EP).

* cited by examiner

Primary Examiner—George Suchfield
(74) Attorney, Agent, or Firm—Robert A. Kent; C. Clark Dougherty, Jr.

(57) ABSTRACT

Methods and compositions for reducing the permeabilities of subterranean zones are provided. The methods of the invention are basically comprised of introducing an aqueous composition comprised of a chelated organic gelling agent and a copolymer of an ethylenically unsaturated polar monomer and an ethylenically unsaturated ester or a terpolymer or tetrapolymer of an ethylenically unsaturated polar monomer, an ethylenically unsaturated ester and a monomer selected from AMPS® and/or N-vinylpyrrolidone into the zone and then allowing the aqueous composition to form a cross-linked gel in the zone.

17 Claims, 2 Drawing Sheets

METHOD AND COMPOSITIONS FOR REDUCING THE PERMEABILITIES OF SUBTERRANEAN ZONES

BACKGROUND OF THE INVENTION

1. Field of the Invention

The present invention relates to methods and compositions for reducing the permeabilities of subterranean zones, and more particularly, to improved water soluble polymeric compositions which form cross-linked gels in the zones.

2. Description of the Prior Art

When wells penetrating oil and gas producing subterranean formations are produced, water often accompanies the oil and gas. The water can be the result of a water producing zone communicated with the oil and gas producing formation by fractures, high permeability streaks and the like, or it can be caused by a variety of other occurrences which are well known to those skilled in the art such as water coning, water cresting, bottom water, channeling at the well bore, etc.

In enhanced recovery techniques such as water flooding, an aqueous flood or displacement fluid is injected under pressure into an oil containing subterranean formation by way of one or more injection wells. The flow of the aqueous fluid through the formation displaces oil contained therein and drives it to one or more producing wells. However, the aqueous displacement fluid often flows through the most permeable zones in the subterranean formation whereby less permeable zones containing oil are bypassed. This uneven flow of the aqueous displacement fluid through the formation reduces the overall yield of hydrocarbons from the formation.

Heretofore, enhanced recovery problems in a subterranean oil containing formation caused by permeability variations therein have been corrected by reducing the permeability of the subterranean formation flow paths having high permeability and low oil content. As a result, the subsequently injected aqueous displacement fluid is forced through flow paths having low permeability and high oil content. The techniques utilized to accomplish this high flow path permeability reduction, referred to in the art as "conformance control techniques," have included injecting aqueous solutions of polymers and gelling agents into the high permeability flow paths whereby the polymers are gelled and cross-linked therein. For example, water soluble polymers including copolymers of acrylamide and acrylic acid cross-linked with chromium or other transition metal ions have been utilized heretofore. In accordance with an early technique, an aqueous solution of one or more of the polymers or copolymers mixed with a cross-linking metal ion is injected into the subterranean formation and allowed to cross-link therein. However, it has heretofore been found that the cross-linked gels formed have often been ineffective at high temperatures, i.e., at temperatures above about 80° C. because of the instability of the cross-linker or polymer. This has resulted in uncontrolled cross-linking rates (too rapid), cross-linker precipitation, polymer degradation, or an inefficient solution propagation. In attempts to correct these problems, the cross-linking metal ion has been coordinated with a ligand such as acetate or propionate to slow the reaction of the metal ion with the polymer. While this and other techniques have been utilized successfully, the use of some metal ions, e.g., chromium, has adverse environmental effects, and the metal ion used can be adsorbed by formation materials whereby it is prevented from functioning to cross-link the polymer.

U.S. Pat. No. 4,773,481 to Allison et al. issued on Sep. 27, 1988 describes a process for reducing the permeability of a subterranean formation by the cross-linking of water soluble polymers of polyalkylene imines and polyalkylenepolyamines with certain polymers which are anionic or hydrolyzable to form anionic polymers. Examples of the anionic polymers are polyacrylamide and alkylpolyacrylamides, copolymers of polyacrylamide and alkylpolyacrylamides with ethylene, propylene and styrene, polymaleic anhydride and polymethylacrylate and hydrolysis products thereof. As described in the patent, when the water-soluble polymer and the anionic polymer are mixed, a viscous gel is quickly formed. In use, a solution of the water-soluble polymer is pumped into the subterranean formation first, followed by water to displace the water soluble polymer from the well bore to thereby prevent premature gelling upon introduction of the anionic polymer. Thereafter, the anionic polymer is pumped into the formation. This three step procedure has a number of disadvantages in practice and is costly to perform, but it is necessary because the water soluble polyalkylene imine or polyalkylenepolyamine reacts very quickly with the anionic polymer and cannot be premixed without premature gelation.

Thus, there are continuing needs for improved methods and compositions for reducing the permeabilities of subterranean zones using water soluble polymeric components whereby the cross-linking of the components is effectively and simply controlled at high temperatures.

SUMMARY OF THE INVENTION

The present invention provides methods and compositions for reducing the permeabilities of subterranean zones at high temperatures which meet the needs described above and overcome the deficiencies of the prior art.

The methods of the present invention basically comprise the steps of introducing an aqueous solution of a chelated organic gelling agent and a copolymer of an ethylenically unsaturated polar monomer and an ethylenically unsaturated ester into a subterranean zone, and then allowing the aqueous solution to form a cross-linked gel in the zone. The chelated organic gelling agent is comprised of a water soluble polyalkylene imine chelated with a metal ion, preferably polyethylene imine chelated with zirconium. The ethylenically unsaturated polar monomer in the copolymer is an amide of an unsaturated carboxylic acid, preferably acrylamide, and the ethylenically unsaturated ester in the copolymer is formed of a hydroxyl compound and an ethylenically unsaturated carboxylic acid such as acrylic acid, methacrylic acid and the like. A preferred unsaturated ester is t-butyl acrylate.

In a further aspect of the present invention, instead of utilizing the above described copolymer which is rapidly cross-linked by the chelated gelling agent once the chelated gelling agent disassociates, the copolymer can be stabilized whereby it does not cross-link as rapidly at high temperatures and also has greater long term gel strength after being cross-linked by forming it into a terpolymer or a tetrapolymer. That is, instead of a copolymer, the above described ethylenically unsaturated polar monomer, preferably acrylamide, and the ethylenically unsaturated ester, preferably t-butyl acrylate, are reacted with AMPS®(2-acrylamido-2-methylpropane sulfonic acid) and/or N-vinylpyrrolidone to produce a terpolymer, e.g., polyacrylamide/t-butyl acrylate/AMPS® or polyacrylamide/t-butyl acrylate/N-vinylpyrrolidone or a tetrapolymer, e.g., polyacrylamide/t-butyl acrylate/AMPS®/

N-vinylpyrrolidone. The most preferred terpolymer is polyacrylamide/t-butyl acrylate/N-vinylpyrrolidone.

The compositions of this invention for reducing the permeability of a subterranean zone are basically comprised of water, a copolymer of an ethylenically unsaturated polar monomer and an ethylenically unsaturated ester or a terpolymer or tetrapolymer of the aforesaid polar monomer and ester with AMPS® and/or N-vinylpyrrolidone, and a chelated organic gelling agent.

It is, therefore, a general object of the present invention to provide improved methods and polymeric compositions for reducing the permeabilities of subterranean zones.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
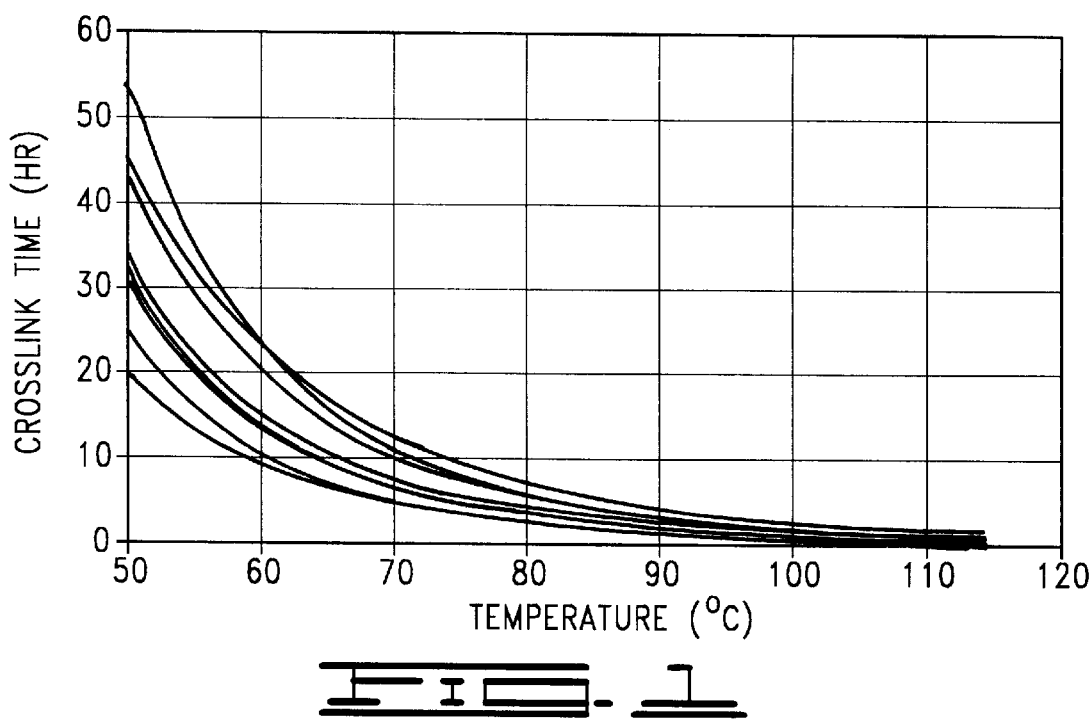
FIG. 1 is a graph illustrating the cross-linking times versus temperature of aqueous polymer compositions having varying non-chelated polyethylene imine gelling agent concentrations therein.

As mentioned, the polymeric compositions of this invention for reducing the permeability of a subterranean zone are basically comprised of water, a copolymer of an ethylenically unsaturated polar monomer and an ethylenically unsaturated ester or a terpolymer or tetrapolymer of an ethylenically unsaturated polar monomer, an ethylenically unsaturated ester, AMPS® and/or N-vinylpyrrolidone and a chelated organic gelling agent.

The water utilized for forming the compositions of this invention may be water from any source so long as it does not adversely react with other components of the composition. Generally, the water can be fresh water, water containing various amounts of one or more salts, brine produced from subterranean formations or seawater.

The copolymers useful in the compositions of this invention are formed from at least one ethylenically unsaturated polar monomer and at least one ethylenically unsaturated ester. The ethylenically unsaturated polar monomer may be derived from an unsaturated carboxylic acid wherein the unsaturated group is vinyl or alpha methyl vinyl. The polar monomer formed from the acid is non-acidic and is preferably a primary, secondary or tertiary amide of the unsaturated carboxylic acid. The amide can be derived from ammonia or a primary or secondary alkylamine, e.g., an alkyl amine having from 1 to 10 carbon atoms which may also be substituted by at least one hydroxyl group. That is, the amide of the acid can be an alkylol amide such as ethanolamide. Examples of suitable ethylenically unsaturated polar monomers are acrylamide, methacrylamide and acrylic ethanol amide. The ethylenically unsaturated polar monomer may also be a vinyl heterocyclic compound with at least an oxygen, sulfur or nitrogen atom in a ring with 3 to 8 carbon atoms, such as one with at least one carbonyl group in the ring, e.g., N-vinylpyrrolidone, caprolactam or a vinyl pyridine.

The ethylenically unsaturated esters which can be used with the ethylenically unsaturated polar monomer described above to form a copolymer are formed from a hydroxyl compound and an ethylenically unsaturated carboxylic acid. The ethylenically unsaturated group is preferably in the alpha to beta or the beta to gamma position relative to the carboxyl group. Preferred acids have in the range of from 3 to 20 carbon atoms. Examples of these acids are acrylic acid, methacrylic acid, crotonic acid and cinnamic acids.

The hydroxyl compound is preferably an alcohol of the formula ROH, where R is a hydrocarbyl group. Preferred hydrocarbyl groups are alkyl groups having from 1 to 30 carbon atoms, alkenyl groups having from 2 to 20 carbon atoms, cycloalkyl groups having from 5 to 8 carbon atoms, aryl groups such as aromatic hydrocarbyl groups having from 6 to 20 carbon atoms and arylalkyl groups having from 7 to 24 carbon atoms. Specific examples of R groups are methyl, ethyl, propyl, butyl, amyl, hexyl, octyl, 2-ethylhexyl and decyl (including all stereoisomers), allyl, cyclohexyl, palmityl, stearyl, phenyl and benzyl. The R group may also be a hydrocarbyl group substituted by at least one, e.g., from 1 to 3 substituents, such as hydroxyl, ether, and thioether groups. Electron donating group substituents are preferred. Ether substituents are also preferred, especially alkoxy, aryloxy and arylalkoxy in which the alkyl, aryl and arylalkyl groups may be as described above. Preferably, the substituent is on the same carbon atom of the R group as is bonded to the hydroxyl group in the hydroxyl compound with alkoxymethyl and arylalkyloxy methyl groups being preferred. The hydroxyl compound may be a primary, secondary, iso or tertiary compound, preferably with a tertiary carbon atom bonded to the hydroxyl group, e.g., tert-butyl and trityl. The R group may also comprise a heterocyclic group either for bonding directly to the hydroxyl group of ROH or separated therefrom by an alkylene group having 1 to 4 carbon atoms such as methylene. Thus, the R group may be a saturated or unsaturated heterocyclic or heterocyclic alkylene group, e.g., having 3 to 8 carbon atoms and at least one or two ring heteroatoms selected from oxygen, nitrogen and sulfur. Examples of such groups are furyl, tetrahydrofuryl, furfuryl and tetrahydrofurfuryl, pyranyl and tetrahydropyranyl. Preferred R groups are tert-butyl, trityl, methoxymethyl, benzyloxymethyl and tetrahydropyranyl. Other less preferred R groups include stearyl, isopropyl, ethyl and methyl. The most preferred ester is t-butyl ester.

The copolymer can contain from about 0.01 to about 50 mole percent of the polar monomer and from about 50 to about 99.99 mole percent of the ester monomer. More preferably the polar monomer is present in the copolymer in an amount of about 85 to about 95 mole percent with the ester monomer being present in an amount of from about 5 to about 15 mole percent. The copolymer may be a block or non-block copolymer, a regular or random copolymer or a graft copolymer whereby the ester units are grafted onto a polymerized polar monomer, e.g., the ester grafted onto polyacrylamide.

The copolymer is preferably soluble in water to the extent of at least 10 grams per liter in distilled water at 15° C. and 10 grams per liter in an aqueous sodium chloride solution containing 32 grams per liter of sodium chloride at 25° C. If desired, the copolymer can be mixed with a surfactant to facilitate its solubility in the water or salt solution utilized. The copolymer can have an average molecular weight in the range of from about 50,000 to 20,000,000 most preferably from about 100,000 to about 500,000. A copolymer having an average molecular weight of about 50,000 has a viscosity when dissolved in distilled water in the amount of about 3.6% by weight of the solution at 19° C. of from about 10 to about 500 centipoises. Preferably, the copolymer is shear thinnable whereby the viscosity reduces by at least 10% on increasing shear rate by 10%. The copolymer can be produced by conventional methods for copolymerizing ethylenically unsaturated monomers in solution, emulsion or suspension.

In order to slow down the cross-linking of the polymer composition and increase its gel strength after it is cross-linked, a terpolymer or tetrapolymer of the above described polar monomer, the above described ester, AMPS® and/or N-vinylpyrrolidone can be substituted for the above described copolymer. The terpolymer can contain from about 50 to about 98.9 mole percent of the polar monomer, from about 0.01 to about 50 mole percent of the ester and from about 1 to about 40 mole percent of the AMPS® or N-vinylpyrrolidone monomer. The tetrapolymer can contain from about 50 to about 97.9 mole percent of the polar monomer, from about 0.01 to about 50 mole percent of the ester, from about 1 to about 20 mole percent of AMPS® and from about 1 to about 20 mole percent of N-vinylpyrrolidone. The terpolymer or tetrapolymer can be a block or non-block polymer, a regular or random polymer or a graft polymer. Also the solubility, molecular weight, viscosity, production and other properties of the terpolymer or tetrapolymer should generally be as described above for the copolymer.

The organic gelling agents suitable for use in accordance with this invention are metal ion chelated water-soluble polymers capable of cross-linking the above described copolymer. Particularly suitable such water-soluble polymeric gelling agents are chelated polyethylene imines and polypropylene imines. Of these, chelated polyethylene imine is the most preferred. As mentioned, by chelating the polymer with a metal ion, the gelling agent is prevented from cross-linking the copolymer prematurely at high temperatures. That is, the polyalkylene imine utilized is chelated with a metal ion selected from the group consisting of zirconium ion, cobalt ion, nickel ion, ferric ion, titanium IV ion and copper ion. Of these, zirconium ion is the most preferred.

Preferred compositions of this invention are comprised of water, a copolymer of an ethylenically unsaturated polar monomer and an ethylenically unsaturated ester or a terpolymer or tetrapolymer of the polar monomer, the ester, AMPS® and/or N-vinylpyrrolidone present in the composition in an amount in the range of from about 1% to about 20% by weight of water therein and a chelated organic gelling agent present in an amount in the range of from about 0.1% to about 4% by weight of water therein. The ethylenically unsaturated polar monomer in the copolymer, terpolymer or tetrapolymer is preferably an amide of an ethylenically unsaturated carboxylic acid, most preferably acrylamide. The ethylenically unsaturated ester in the copolymer, terpolymer or tetrapolymer is preferably formed of a hydroxyl compound and an ethylenically unsaturated carboxylic acid selected from the group of acrylic acid, methacrylic acid, crotonic acid and cinnamic acid. The hydroxyl compound is preferably an alcohol having the formula ROH wherein R is a group selected from alkyl, alkenyl, cycloalkyl, aryl, arylalkyl or an aromatic or heterocyclic group substituted with one or more groups selected from hydroxyl, ether and thioether groups. Most preferably, the ethylenically unsaturated ester monomer is t-butyl acrylate. As mentioned, the terpolymer or tetrapolymer also includes an AMPS® monomer and/or a N-vinylpyrrolidone monomer. The chelated organic gelling agent is preferably a water-soluble polyalkyleneimine chelated with a metal ion selected from the group of zirconium ion, cobalt ion, nickel ion, ferric ion, titanium IV ion and copper ion. Most preferably the gelling agent is comprised of polyethylene imine chelated with zirconium ion. Generally, the chelated gelling agent is comprised of a ratio of metal ion to polyalkyleneimine in the range of from about 2:1 to about 1:10 parts by weight, preferably about 1:5 parts by weight.

The most preferred compositions of this invention for reducing the permeability of a subterranean zone are comprised of water, a copolymer of acrylamide and t-butyl acrylate or a terpolymer of acrylamide, t-butyl acrylate and N-vinylpyrrolidone present in an amount of about 5% by weight of the water therein and a gelling agent comprised of polyethylene imine chelated with zirconium in a weight ratio of from about 1 part zirconium to about 5 parts polyethylene imine by weight present in the composition in an amount of about 1% by weight of water therein.

It has been found that the cross-linking reaction between a copolymer, terpolymer or tetrapolymer of this invention with a non-chelated polyalkyleneimine gelling agent involves two different mechanisms at temperatures below and above 110° C. If the cross-linking takes place at a temperature below 110° C., the cross-linked polymers form a covalent thermally stable gel up to temperatures at least as high as about 160° C. If the cross-linking reaction takes place above 110° C., the final gel can undergo syneresis within a few hours. However, when the chelated polyalkyleneimine gelling agent of this invention is utilized, the polymers can be cross-linked above 110° C. and still remain stable without syneresis. This is due to the metal ion cross-linking the sites not cross-linked by the gelling agent polymer.

The methods of this invention for reducing the permeability of a subterranean zone are comprised of the steps of introducing an aqueous composition comprised of water, a chelated organic gelling agent and a copolymer of an ethylenically unsaturated polar monomer and an ethylenically unsaturated ester or a terpolymer or tetrapolymer of the polar monomer, the ester and an AMPS® and/or a N-vinylpyrrolidone monomer into the zone, and then allowing the aqueous composition to form a cross-linked gel in the zone. The formation of the cross-linked gel in the zone reduces or completely blocks the permeability of the zone whereby fluid flow through the zone is reduced or terminated.

In order to further illustrate the methods and compositions of this invention, the following examples are given.

EXAMPLE 1

Eight aqueous polymer compositions comprised of water, a copolymer of acrylamide and t-butyl acrylate and non-chelated polyethylene imine were prepared containing different quantities of copolymer and polyethylene imine, i.e., quantities of polyethylene imine from about 0.17% to about 2% by weight of water in the composition and quantities of copolymer from about 3% to about 10% by weight of water in the composition. Samples of each composition were allowed to cross-link at temperatures ranging from 50° C. to 115° C. and the cross-link time for each composition at each temperature was determined. These data points were then utilized to prepare a cross-link time (hours) versus temperature (° C.) graph which is shown in FIG. 1.

As can be seen by viewing FIG. 1, as the temperature increases, the cross-link times for the compositions converge illustrating that at high temperatures the cross-linking of the polymer composition takes place very rapidly regardless of the quantity of gelling agent in the composition.

EXAMPLE 2

An aqueous polymer composition comprised of water, a copolymer comprised of acrylamide and t-butyl acrylate present in the composition in an amount of about 10% by weight of water therein and a non-chelated polyethylene imine gelling agent present in the composition in an amount of about 1% by weight of water therein was prepared. The pH of the composition was adjusted to 9.6 with HCl. The time required for the aqueous polymer composition to cross-link at 100° C. was determined.

A second aqueous polymer composition having a pH of 9.6 identical to the above described composition was prepared except that the polyethylene imine gelling agent used was chelated with zirconium ion. The time required for the second aqueous polymer composition to cross-link at 100° C. was also determined. The results of these tests are shown in the graph of viscosity (cp) versus gel time (hours) presented in FIG. 2.

Figure 2:
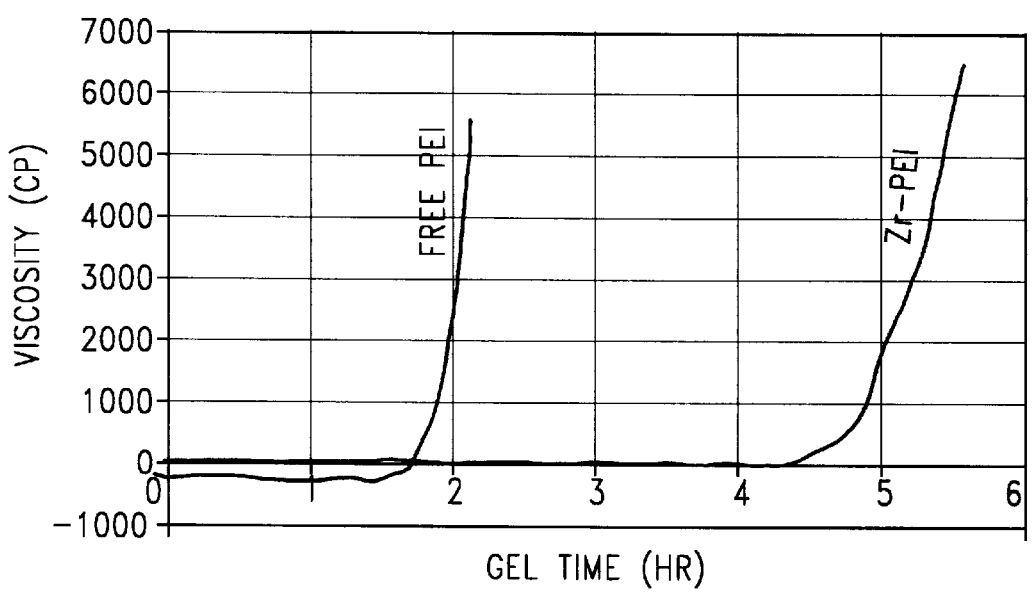
FIG. 2 is a graph of viscosity versus gel time for an aqueous polymer composition containing a non-chelated polyethylene imine gelling agent and for a similar aqueous polymer composition containing a metal ion chelated polyethylene imine gelling agent.

From FIG. 2, it can be seen that the aqueous polymer composition including a chelated polyethylene imine gelling agent took about twice as long to cross-link as the composition containing a non-chelated polyethylene imine gelling agent.

EXAMPLE 3

A number of aqueous polymer compositions were prepared using various salt water solutions, a copolymer comprised of acrylamide and t-butyl acrylate present in the aqueous polymer compositions in an amount of about 5% by weight of water therein and various polyethylene imine (PEI) gelling agents including non-chelated gelling agents and zirconium (Zr) chelated gelling agents. The compositions were allowed to cross-link at 122° C. and to cure at that temperature for various time periods after which the cross-linked and cured polymers were examined for syneresis. The results of these tests are set forth in Table I below.

TABLE I

Syneresis Tests

| Composition No. | Amount of Non-Chelated PEI, % by weight of water | Amount of Chelated PEI, % by weight of water | Weight Ratio of Zr to PEI | Salt Solution Used | Time Cured at 122° C. | Comments Concerning Syneresis |
|---|---|---|---|---|---|---|
| 1 | — | 1 | 1:5 | 2% by wt. KCl | 8 Days | No Syneresis |
| 2 | — | 1 | 1:10 | 2% by wt. KCl | 8 Days | 24% Syneresis |
| 3 | — | 1 | 1:5 | seawater | 8 Days | 15% Syneresis |
| 4 | — | 1 | 1:10 | seawater | 8 Days | 32% Syneresis |
| 5 | — | 0.5 | 1:5 | 2% by wt. KCl | 8 Days | No Syneresis |
| 6 | — | 0.5 | 1:5 | 6% by wt. KCl | 8 Days | No Syneresis |
| 7 | — | 0.5 | 1:5 | 6% by wt. NaCl | 8 Days | No Syneresis |
| 8 | — | — | 1:5 | 6% by wt. KCl | 8 Days | 15% Syneresis |
| 9 | 1 | — | — | 2% by wt. KCl | 16 Hours | 27% Syneresis |
| 10 | 0.5 | — | — | 2% by wt. KCl | 16 Hours | 25% Syneresis |

From Table I it can be seen that the aqueous polymer compositions of the present invention formed using low concentration salt solutions and/or Zr to PEI ratios of 1:5 were stable and did not exhibit syneresis.

EXAMPLE 4

Three aqueous polymer compositions were prepared using 2% by weight KCl aqueous solutions. The first contained a copolymer comprised of acrylamide and t-butyl acrylate (AA-tBA) in an amount of about 7% by weight of the water therein and a non-chelated polyethylene imine (PEI) gelling agent in an amount of about 0.5% by weight of the water. The second contained a terpolymer comprised of acrylamide, t-butyl acrylate and N-vinylpyrrolidone (AA-tBA-NVP) in an amount of about 7% by weight of water and a non-chelated polyethylene imine (PEI) gelling agent in an amount of about 0.5% by weight of water. The third contained a terpolymer comprised of acrylamide, t-butyl acrylate and N-vinylpyrrolidone (AA-tBA-NVP) in an amount of about 7% by weight of water and a gelling agent comprised of polyethylene imine chelated with Zirconium (Zr PEI) in an amount of about 0.5% by weight of water.

Figure 3:
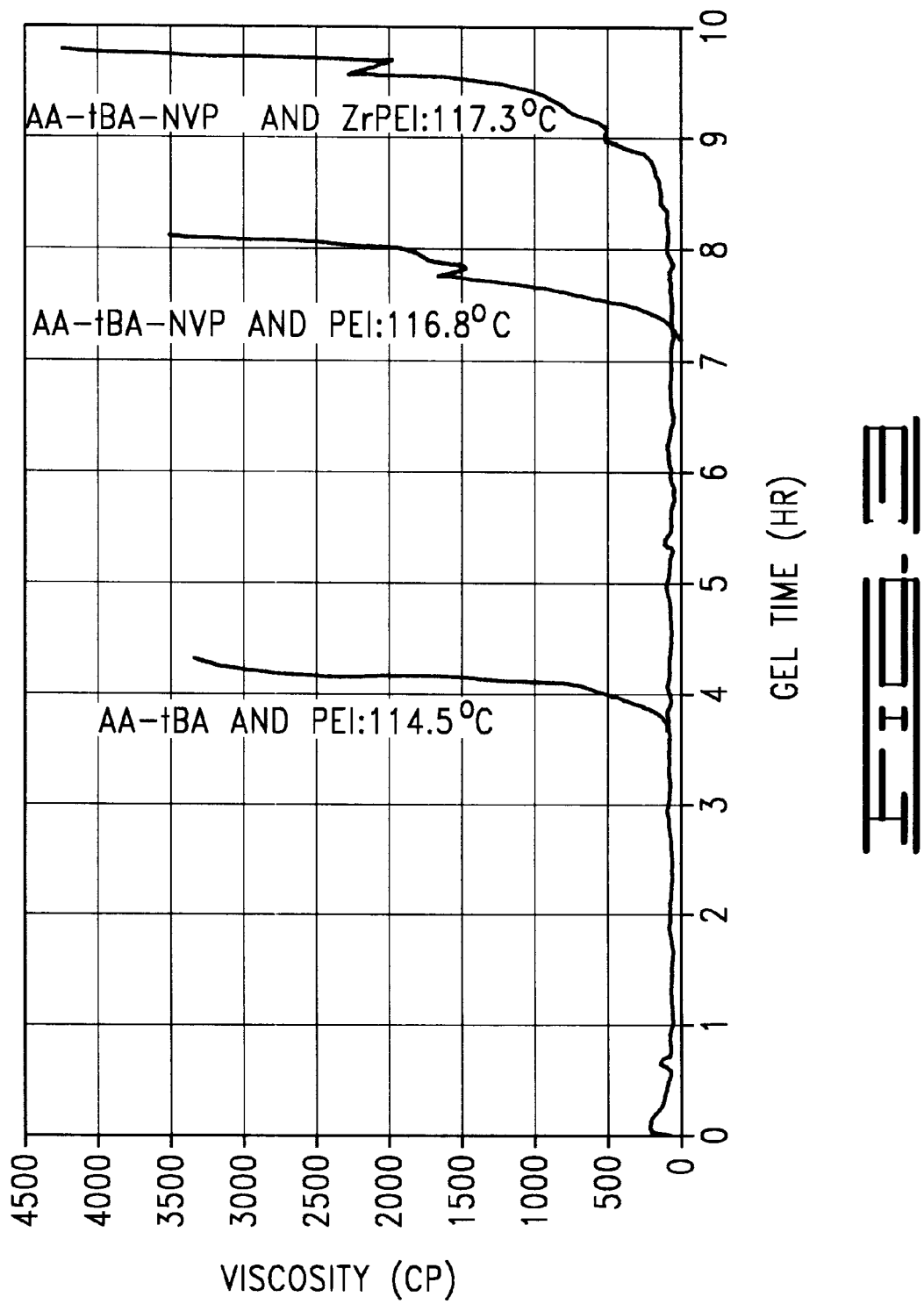
FIG. 3 is a graph of viscosity versus gel time for an aqueous copolymer composition containing a non-chelated polyethylene imine gelling agent, for an aqueous terpolymer composition containing a non-chelated polyethylene imine gelling agent, and for an aqueous terpolymer composition containing a chelated polyethylene imine gelling agent.

The times required for the three compositions to cross-link at a temperature in the range of from about 114° C. to about 118° C. were determined and are shown in the graph of viscosity (cp) versus gel time (hours) presented in FIG. 3.

From FIG. 3, it can be seen that the first polymer composition containing the copolymer AA-tBA and non-chelated PEI gelled first (about 4 hrs. gel time) followed by the second polymer composition containing the terpolymer AA-tBA-NVP and non-chelated PEI (about 8 hrs. gel time) with the third composition containing the terpolymer AA-tBA-NVP and chelated PEI gelling agent being last (about 9.5 hrs. gel time).

EXAMPLE 5

Various aqueous polymer compositions were prepared using 2% by weight KCl aqueous solutions, various copolymers and terpolymers and chelated and non-chelated polyethylene imine gelling agents. The polymer compositions were allowed to gel, tested for gel strength and then heated at a temperature of 182° C. for four days. Thereafter, the gelled compositions were tested for gel strength (expressed in percent of the gel strength before heating) and syneresis (expressed in percent). The components of the tested compositions, their quantities and the results of the tests are given in Table II below.

TABLE II

Gel Strength and Syneresis Tests

| Composition No. | Copolymer or Terpolymer Used | Amount of Copolymer or Terpolymer, % by weight of the composition | Amount of Chelated PEI[1] Used, % by weight of the composition | Amount of Non-Chelated PEI Used, % by weight of the composition | Gel Strength, % | Syneresis, % |
|---|---|---|---|---|---|---|
| 1 | AA-tBA | 0.7 | — | 0.5 | Gel broken | |
| 2 | AA-tBA-AMPS | 0.7 | — | 0.5 | 30 | 50 |
| 3 | AA-tBA-NVP | 0.7 | — | 0.5 | 100 | 20 |
| 4 | AA-tBA | 0.7 | 0.5 | — | 90 | 0 |
| 5 | AA-tBA-NVP | 0.7 | 0.5 | — | 100 | 0 |

[1]Zr to PEI weight ratio was 1:5

From Table II, it can be seen that the chelated PEI produced the highest copolymer gel strength and that the chelated PEI in combination with an AA-tBA-NVP terpolymer produced the best gel strength (100%) without syneresis.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the permeability of a subterranean zone comprising the steps of:
   (a) introducing an aqueous composition comprised of water, a chelated organic gelling agent comprised of a metal ion chelated water soluble polyalkylene imine and a water soluble polymer capable of being cross-linked by said gelling agent into said zone; and then
   (b) allowing said aqueous composition to form a cross-linked gel in said zone.

2. The method of claim 1 wherein said water soluble polymer is a copolymer of an ethylenically unsaturated polar monomer and an ethylenically unsaturated ester.

3. The method of claim 1 wherein said water soluble polymer is a terpolymer of an ethylenically unsaturated polar monomer, an ethylenically unsaturated ester and a monomer selected from the group consisting of AMPS® or N-vinylpyrrolidone or said water soluble polymer is a tetrapolymer of an ethylenically unsaturated polar monomer, an ethylenically unsaturated ester, AMPS® and N-vinylpyrrolidone.

4. The method of claim 1 wherein said polyalkylene imine comprises at least one member selected from the group consisting of polyethylene imine and polypropylene imine.

5. The method of claim 1 wherein said polyalkylene imine is polyethylene imine.

6. The method of claim 1 wherein said metal ion comprises at least one member selected from the group consisting of zirconium ion, cobalt ion, nickel ion, ferric ion, titanium IV ion and copper ion.

7. The method of claim 1 wherein said metal ion is zirconium ion.

8. The method of claim 2 wherein said ethylenically unsaturated polar monomer in said copolymer is an amide of an unsaturated carboxylic acid.

9. The method of claim 2 wherein said ethylenically unsaturated polar monomer in said copolymer is acrylamide.

10. The method of claim 2 wherein said ethylenically unsaturated ester in said copolymer is formed of a hydroxyl compound and an ethylenically unsaturated carboxylic acid selected from the group consisting of acrylic acid, methacrylic acid, crotonic acid and cinnamic acid.

11. The method of claim 10 wherein said hydroxyl compound is an alcohol having the formula ROH wherein R is a group selected from the group consisting of alkyl, alkenyl, cycloalkyl, aryl, arylalkyl and an aromatic or heterocyclic group substituted with one or more groups selected from hydroxyl, ether and thioether.

12. The method of claim 2 wherein said ethylenically unsaturated ester is t-butyl acrylate.

13. The method of claim 3 wherein said ethylenically unsaturated polar monomer in said terpolymer or tetrapolymer is an amide of an unsaturated carboxylic acid.

14. The method of claim 3 wherein said ethylenically unsaturated polar monomer in said terpolymer or tetrapolymer is acrylamide.

15. The method of claim 3 wherein said ethylenically unsaturated ester in said terpolymer or tetrapolymer is formed of a hydroxyl compound and an ethylenically unsaturated carboxylic acid selected from the group consisting of acrylic acid, methacrylic acid, crotonic acid and cinnamic acid.

16. The method of claim 15 wherein said hydroxyl compound is an alcohol having the formula ROH wherein R is a group selected from the group consisting of alkyl, alkenyl, cycloalkyl, aryl, arylalkyl and an aromatic or heterocyclic group substituted with one or more groups selected from hydroxyl, ether and thioether.

17. The method of claim 3 wherein said ethylenically unsaturated ester is t-butyl acrylate.

* * * * *